US012582120B2

(12) United States Patent
Nagel et al.

(10) Patent No.: US 12,582,120 B2
(45) Date of Patent: Mar. 24, 2026

(54) COMPOSITIONS WITH FATTY ACIDS AND OPTIONAL CATIONIC COMPOUNDS AND METHODS OF USE

(71) Applicant: Ecolab USA Inc., St. Paul, MN (US)

(72) Inventors: Chris Nagel, St. Paul, MN (US); Junzhong Li, Eagan, MN (US); Maria Elizabeth Gilson, Minneapolis, MN (US); Benjamin Ledezma Martinez, Meeker, OK (US)

(73) Assignee: ECOLAB USA INC., St. Paul, MN (US)

( * ) Notice: Subject to any disclaimer, the term of this patent is extended or adjusted under 35 U.S.C. 154(b) by 167 days.

(21) Appl. No.: 17/711,444

(22) Filed: Apr. 1, 2022

(65) Prior Publication Data

US 2022/0322663 A1 Oct. 13, 2022

Related U.S. Application Data

(60) Provisional application No. 63/169,356, filed on Apr. 1, 2021.

(51) Int. Cl.

*A01N 37/02* (2006.01)
*A01N 25/02* (2006.01)
*A01N 25/30* (2006.01)
*A01P 1/00* (2006.01)

(52) U.S. Cl.

CPC ............. *A01N 37/02* (2013.01); *A01N 25/02* (2013.01); *A01N 25/30* (2013.01); *A01P 1/00* (2021.08)

(58) Field of Classification Search

CPC ... A47L 13/17; A47L 13/256; A01N 2300/00; A01N 37/02; A01N 37/36; A01N 59/26
See application file for complete search history.

(56) References Cited

U.S. PATENT DOCUMENTS

| | | | | |
|---|---|---|---|---|
| 5,336,668 | A | 8/1994 | della Valle et al. | |
| 5,824,531 | A | 10/1998 | Outtrup et al. | |
| 6,431,370 | B1 | 8/2002 | Braunstein et al. | |
| 8,734,879 | B2 | 5/2014 | Sawyer et al. | |
| 2009/0011096 | A1 | 1/2009 | Bakal | |
| 2010/0324137 | A1 * | 12/2010 | Coughlin | A01N 47/44 514/551 |
| 2013/0136832 | A1 | 5/2013 | Sawyer et al. | |
| 2018/0103671 | A1 | 4/2018 | Hernandez-Brenes et al. | |

FOREIGN PATENT DOCUMENTS

| | | | | |
|---|---|---|---|---|
| CA | 1 288 658 | C | 9/1991 | |
| CA | 2 686 887 | C | 2/2016 | |
| CA | 2 807 779 | C | 6/2019 | |
| CN | 105505617 | A | 4/2016 | |
| CN | 106588701 | A | 4/2017 | |
| CN | 106701350 | B | 8/2018 | |
| CN | 108930159 | A | 12/2018 | |
| CN | 109504573 | A | 3/2019 | |
| FI | 119693 | B | 2/2009 | |
| FI | 121074 | B | 6/2010 | |
| IT | 1203814 | B | 2/1989 | |
| JP | 2000-96098 | A | 4/2000 | |
| JP | 2002-507236 | A | 3/2002 | |
| MX | 2009008129 | A | 3/2010 | |
| MX | 2010004668 | A | 5/2010 | |
| WO | 95/26397 | A1 | 10/1995 | |
| WO | 96/12000 | A1 | 4/1996 | |
| WO | 96/12004 | A1 | 4/1996 | |
| WO | 96/23061 | A1 | 8/1996 | |
| WO | 97/14498 | A1 | 4/1997 | |
| WO | 2012/055855 | A1 | 5/2012 | |
| WO | WO2020/144522 | A1 * | 7/2020 | A01N 37/02 |

OTHER PUBLICATIONS

International Search Report and Written Opinion for Application No. PCT/US2022/023086 mailed Jun. 23, 2022.

Nerin et al., Ethyl Lauroyl Arginate (LAE): Antimicrobial Activity and Applications in Food Systems, Antimicrobial Food Packaging, Chapter 23, pp. 305-312 (2016).

Entani et al., "Antibacterial Action of Vinegar Against Food-Borne Pathogenic Bacteria Including *Esherichia coli* O157: H7 (Part 1): Bacteriostatic and bactericidal Activities," The Journal of the Japanese Association for Infectious Diseases Online Journal, vol. 71, Issue 5, pp. 443-450 (1997) (In Japanese with English Abstract).

* cited by examiner

*Primary Examiner* — Audrea B Coniglio
(74) *Attorney, Agent, or Firm* — Merchant & Gould P.C.

(57) ABSTRACT

Compositions with a C5 to C22 fatty acid and an optional cationic amino/ester, cationic amino/amide, or salts thereof are disclosed along with methods of using such compositions to prevent corrosion or reduce microorganisms on surfaces over a broad pH range.

38 Claims, No Drawings

COMPOSITIONS WITH FATTY ACIDS AND OPTIONAL CATIONIC COMPOUNDS AND METHODS OF USE

CROSS-REFERENCE TO RELATED APPLICATIONS

This application claims the benefit of U.S. Provisional Patent Application Ser. No. 63/169,356 filed Apr. 1, 2021, which is hereby incorporated by reference in its entirety.

BACKGROUND

Products that contact or are ingested by humans and animals require the highest level of safety. Such products include food, beverages, nutraceuticals, cosmetics, topical products, and pharmaceuticals for humans and animals, pet food, and animal feed. Microorganisms can interfere during the processing of products for humans and animals. Sometimes, those microorganisms are inherent to the product itself—as in the case of processing meat for human consumption or in dairy processing. Sometimes those microorganisms are the result of undesired microbial growth within the processing operation. Efforts to eliminate microbial growth within processing operations typically include regular and rigorous cleaning and sanitizing. Antimicrobial products are widely used in such normal cleaning and sanitizing operations.

Cleaning and sanitizing products continue to receive a high level of scrutiny, especially where the products directly contact a product that might be consumed, such as a ready-to-eat meat product, or in situations where the cleaning or sanitizing product may linger behind on the processing equipment, for example, on a membrane surface. Peracids are a widely used antimicrobial agent for food and beverage operations in part because commonly used peracids degrade into a fatty acid, water, oxygen, and carbon dioxide, all of which are non-toxic. In order for peracids to be effective sanitizers, they are typically used in a pH range of equal or less than 8. This pH range works for some operations but not all. Furthermore, the oxidative property of peracid is corrosive to certain metals and polymers. Other well-known antimicrobial agents cause corrosion problems including chlorine, iodine, acid-anionic sanitizers, and oxidizers.

It is against this background that the present disclosure is made.

SUMMARY

In some embodiments, the disclosure relates to compositions and methods for sanitizing a surface comprising applying to a surface a composition comprising a C5 to C22 fatty acid or salt thereof and a source of alkalinity, wherein the composition has a pH of 8.5 or greater and provides 3-log reduction against gram positive bacteria, gram negative bacteria, and yeasts within 1 minute at 50° C. In some embodiments, the disclosure relates to compositions and methods for sanitizing a surface comprising applying to a surface a composition comprising (1) a C5 to C22 fatty acid or salt thereof; and (2) a cationic amino/ester, cationic amino/amide, or salt thereof. The compositions can be concentrates or use solutions.

DETAILED DESCRIPTION

Industries that make products for contact with or consumption by humans or animals demand a high degree of sanitation so that the microorganism content of the final product is either zero or below an accepted threshold of microorganisms that may be harmful to humans or animals or that may compromise the quality of the final product. Such microorganisms include pathogenic and spoilage microorganisms. Humans and animals also encounter microorganisms when interacting with their environment in day-to-day activities and such surfaces also need to be sanitized.

In some situations, sanitation may involve rigorously cleaning and sanitizing the surfaces that contact the products and surfaces that humans and animals interact with. A nonexclusive list of such surfaces include the following: processing equipment (e.g., tanks, pipes, nozzles, spray dryers, evaporators, condensers, membranes, poultry chillers, inside-outside bird washers, slaughtering equipment, heat exchangers, fluid bed dryers, cone dryers, separators, homogenizers, pasteurizers, cooling towers, ovens, cabinet ovens, combi ovens, conveyor belts, paper mill equipment, refinery distillation towers, flumes, slicing equipment, canning equipment, processing tools such as knives, saws), environmental surfaces (e.g., floors, walls, ceilings, drains, loading docks, ramps, parking pads, carts, restrooms), transportation equipment (e.g., milk tankers, livestock trucks, trailers, train cars, cargo holds, airplanes, shipping containers, crates), animal rearing or holding surfaces such as milking stalls, milking equipment, foot baths, barns, crates, and pens, retail surfaces (e.g., knives, cutting boards, butcher blocks, butcher equipment, meat slicers, refrigeration and freezer equipment, storage and display cases), restaurant surfaces (e.g., counters, ovens, fryers, cooktops, utensils, tables, chairs), and human and veterinary heath locations (e.g., dental offices, operating suites, examination rooms, waiting rooms, patient tables, tools, equipment), high touch surfaces (light switch, door knob, telephone, TV, call box, tray table, bedside table, bedrails, toilet handles, push plates, push bars, railings, escalators, push buttons, arm rests, tray tables, hand grips, handle straps, touchscreen monitors) and the like. In some situations, sanitation may require direct contact of the sanitizer with humans, animals, food, or beverages as in the case of direct contact with raw meat, ready-to-eat meat, eggs, dairy products, food packaging that then contacts the food such as aseptic packaging, teat dips in the dairy operations, animal foot baths, and direct contact with humans and animals in healthcare or veterinary applications.

Many sanitizers are known but are not preferred for certain applications because of the toxicity profile, material compatibility, corrosion, or efficacy with a desired pH range. Surprisingly, compositions with a fatty acid having 5 to 22 carbon atoms or a combination of (1) a fatty acid having 5 to 22 carbon atoms and (2) a cationic amino/ester or cationic amino/amide provide an unexpected antimicrobial benefit across a broad pH range. Such compositions (1) have unexpectedly broad antimicrobial efficacy against microorganisms, (2) are non-toxic to humans and animals because the materials break down into fatty acids and amino acids, (3) are not corrosive to sensitive materials such as soft metals and polymers, and (4) are effective across a broad pH range.

The Composition

The disclosed compositions include either a fatty acid having 5 to 22 carbon atoms, or (1) a fatty acid having 5 to 22 carbon atoms, and (2) a cationic amino/ester or cationic amino/amide. In some embodiments, the compositions also include a source of alkalinity. In some embodiments, the compositions comprise or consist of only food grade materials, feed grade materials, or both. In some embodiments, the compositions are provided as concentrates or use solutions. In some embodiments, the concentrate or use solution can be free of added water. In some embodiments, the concentrate or use solution can be made using exclusively materials that are characterized as food grade, feed grade, or generally recognized as safe.

The present compositions have broad efficacy against gram positive bacteria (e.g., ATCC 14869, *Lactobacillus brevis*), gram negative bacteria (e.g., ATCC 15973, *Acetobacter aceti*), and yeasts (e.g., ATCC 834, *Saccharomyces cerevisiae*). When used at room temperature, the present compositions achieve a 3-log, 4-log, or 5-log reduction against gram positive bacteria within 1 minute, within 5 minutes, or within 10 minutes. When used at temperatures of 50° C. or above, the present compositions achieve a 3-log, 4-log, or 5-log reduction against gram positive bacteria within 30 seconds, within 1 minute, within 5 minutes, or within 10 minutes. In some embodiments, when used a room temperature, the present compositions achieve a 3-log, 4-log, or 5-log reduction against gram negative bacteria within 1 minute, within 5 minutes, or within 10 minutes. In some embodiments, when used at temperatures of 50° C. or above, the present compositions achieve a 3-log, 4-log, or 5-log reduction against gram negative bacteria within 30 seconds, within 1 minutes, within 5 minutes, or within 10 minutes. In some embodiments, when used a room temperature, the present compositions achieve a 3-log, 4-log, or 5-log reduction against yeast within 1 minute, within 5 minutes, or within 10 minutes. In some embodiments, when used at temperatures of 50° C. or above, the present compositions achieve a 3-log, 4-log, or 5-log reduction against yeast within 30 seconds, 1 minute, within 5 minutes, or within 10 minutes.

In some embodiments, the present compositions degrade into non-toxic materials such as fatty acids and amino acids. In some embodiments, the degradation products are food grade or feed grade materials. For example, most fatty acids with 5 to 22 carbon atoms are considered to be food grade and feed grade. In certain embodiments, when the cationic amino/esters or cationic amino/amides degrade, they break down into a fatty acid and an amino acid—both of which can be selected to be a food grade or feed grade material. Accordingly, in some embodiments, if the disclosed compositions are applied to a surface and allowed to remain on that surface without being removed or rinsed off, if humans or animals contact that surface, any residual product will be food grade or feed grade. In some embodiments, the present compositions are suitable for use as a "no-rinse" sanitizer under certain regulations. A "no-rinse" sanitizer means that the composition can be applied to a surface and does not need to be rinsed off or washed off, but can remain on the surface. In some embodiments, the present compositions are suitable for direct contact with food or feed for human or animal consumption. In some embodiments, the present compositions are suitable for direct or indirect food contact as defined by the U.S. EPA and FDA.

Peroxycarboxylic acids and hydrogen peroxide are two examples of commercially available antimicrobial agents that degrade into non-toxic materials. These materials are suitable for certain applications but cause corrosion to certain materials. An advantage of the present compositions is that they are not corrosive and can be used on a number of materials and surfaces. The present compositions also do not interact with food surfaces or cause organoleptic changes in the taste, smell, or appearance of food. Some non-limiting examples of materials that are compatible with the present compositions include: tin, iron, aluminum, zinc, lead, cadmium, magnesium, steel, plated steel, chrome steel, ferritic alloy steels, austenitic stainless steels, precipitation-hardened stainless steels, nickel steel, carbon steel, stone surfaces, marble, limestone, calcium carbonate-containing surfaces, granite, ceramic surfaces, cellulose materials, cellulose acetate, polymeric surfaces such as polyamide, polysulfone, vinylidene fluoride, polypropylene, polycarbonate, and acrylonitrile, and elastomeric materials such as nitrile rubber, silicone, fluoroelastomers, ethylene propylene diene monomer rubber (EPDM), raw meat, ready-to-eat meat, milk, and eggs. Similarly, the present compositions are also not irritating when they contact human or animal skin or tissue.

Certain commercially available antimicrobial agents need to be used in a certain pH range in order for the antimicrobial agent to be active. The following table lists known antimicrobial agents and the pH range within which the antimicrobial agent is active.

TABLE 1

| Antimicrobial Agent | Typical Antimicrobial pH Range |
|---|---|
| peracetic acid | <7 |
| peroctanoic acid | <5 |
| quaternary ammonium chloride | 3-11 |
| hydrogen peroxide | <5 |
| chlorine | 5-12 |
| acidified sodium chlorite | 2.5-4 |

When the antimicrobial agents listed in Table 1 are used outside of their ideal pH range, the activity of the antimicrobial drops off and adjustments to contact time, concentration, or temperature need to be made in order to maintain the antimicrobial efficacy. If such adjustments are not made, the antimicrobial efficacy will suffer. Table 1 demonstrates that typical antimicrobial agents must be selected according to the pH of the environment that they are going to be used in. If the pH in an application is not stable or if the pH changes while the antimicrobial agent is being used, a selected antimicrobial agent may not be effective throughout the application if it is not active at certain pH levels.

The present compositions have been found to have antimicrobial activity over a pH range of 2-11. This is unexpected because the materials—the fatty acid and the optional cationic amino/ester or cationic amino/amide—are influenced by pH. Below a pH of 3.5, the fatty acid exists in a protonated form. And below a pH of 6, the activity of the composition is compromised by possible protonation of the targeted microorganisms. It is unexpected that pH does not affect the activity of this composition in view of the chemical changes that occur to the fatty acid and the cationic amino/ester or cationic amino/amide as the pH changes.

The activity of the present compositions over a wide pH range is beneficial to applications where the pH is not stable or where the pH changes. For example, in clean-in-place operations like biofuel generation or brewery applications, clean-in-place cleaning may involve first cleaning with a high pH (e.g., sodium hydroxide) or low pH (e.g., strong acid) solution. This cleaning solution may then be rinsed out of the system before the sanitizer is applied. If the cleaning solution is not completely rinsed out, any lingering alkalinity or acid within the clean-in-place system can change the pH of the system significantly. Variations in water quality and pH at the plant can also cause unexpected pH variations. In certain applications, vapors become incorporated into aqueous solutions within the clean-in-place system causing pH changes. For example, when carbon dioxide vapors incorporate into the clean-in-place solutions, they form carbonic acid and lower the pH of the clean-in-place solution. Providing operators with an antimicrobial agent that can be used independent of the pH of the system allows the operator to only have to source one antimicrobial agent instead of multiple antimicrobial agents. It also allows for a more streamlined treatment process and confidence that the composition is not being used outside of the pH range required for antimicrobial efficacy.

The Fatty Acid

The disclosed compositions include one or more fatty acids. The fatty acids may have 5 to 22, 5 to 18, 5 to 15, or 5 to 10 carbons. In some embodiments, the fatty acid has 8 or 9 carbon atoms. The fatty acid may be saturated or unsaturated, branched or unbranched, substituted or unsubstituted. In some embodiments, the fatty acid is unsubstituted.

Exemplary fatty acids include pentanoic acid, hexanoic acid, heptanoic acid, octanoic acid, nonanoic acid, decanoic acid, undecanoic acid, dodecanoic acid, lauric acid, and salts thereof. In some embodiments the fatty acid is a branched fatty acid with 5 to 22, 5 to 18, 5 to 15, or 5 to 12 carbon atoms. Exemplary branched structures include iso-, neo-, sec-, or tert-branched fatty acids and may include one or more branches off of a main carbon chain. Exemplary branched fatty acids include isononanoic acid, isooctanoic acid, neodecanoic acid, neopenanoic acid, neoheptanoic acid, trimethylhexanoic acid, methyl heptanoic acid, dimethyloctanoic acid, dimethylpentanoic acid, In some embodiments, the fatty acid is included in the composition as a salt. This is especially true at pH levels where the hydroxyl group on the carboxylic acid is deprotonated, for example at pH levels above 4. Exemplary ions for forming the salt include sodium, potassium, calcium, magnesium, and aluminum.

In some embodiments, the fatty acid is included in a concentrate in an amount from about 1 to about 90 wt. %, from about 2 to about 50 wt. %, or from about 5 to about 20 wt. %.

In some embodiments, the fatty acid is included in a ready-to-use solution in an amount from about 10 to about 1000 ppm, from about 50 to about 500 ppm, or from about 100 to about 200 ppm.

The Cationic Amino/Ester or Cationic Amino/Amide Compounds

The disclosed compositions optionally include at least one cationic compound with either an amino and ester functionality or amino and amide functionality having the following structure:

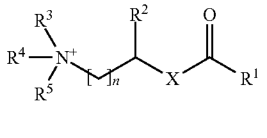

wherein:

n=1-5;

R1=C8-C20 linear or branched alkyl or alkene;

X=N, O;

R2=H, substituted alkyl, ester; and

R3, R4, R5=H, amine, substituted alkyl, alkyl amine.

In some embodiments, the cationic compound is derived from naturally-occurring components such as amino acids and fatty acids. The benefit of using naturally-derived materials to make the cationic compound is that they break down back into naturally-derived raw materials. In other embodiments, the cationic compound is synthetically-derived. Synthetically-derived cationic compounds may still be designed to break down into naturally-occurring raw materials or raw materials that are considered to be food additive or feed additive compatible.

In some embodiments, the cationic compound is derived from an amino acid and a fatty acid. A preferred amino acid is arginine. Before the amino acid is reacted with the fatty acid, it is esterified. One method of esterifying the amino acid is to react it with a lower-chain alcohol such as methanol, ethanol, butanol, propanol, or isopropanol. The esterified amino acid is then reacted with the fatty acid. Preferred fatty acids have 5 to 22, 5 to 18, 5 to 15, or 5 to 10 carbon atoms. In some embodiments, the fatty acid has 8 or 9 carbon atoms. The fatty acid may be saturated or unsaturated, branched or unbranched, substituted or unsubstituted. In some embodiments, the fatty acid is unsubstituted.

Exemplary fatty acids include pentanoic acid, hexanoic acid, heptanoic acid, octanoic acid, nonanoic acid, decanoic acid, undecanoic acid, dodecanoic acid, lauric acid, and salts thereof. In some embodiments the fatty acid is a branched fatty acid with 5 to 22, 5 to 18, 5 to 15, or 5 to 12 carbon atoms. Exemplary branched structures include iso-, neo-, sec-, or tert-branched fatty acids and may include one or more branches off of a main carbon chain. Exemplary branched fatty acids include isononanoic acid, isooctanoic acid, neodecanoic acid, neopenanoic acid, neoheptanoic acid, trimethylhexanoic acid, methyl heptanoic acid, dimethyloctanoic acid, and dimethylpentanoic acid.

The cationic compound is typically provided in the composition as a salt.

Exemplary cationic compounds include alkyl lauroyl arginate, ethyl lauroyl arginate, alkyl cocoyl arginate, or ethyl cocoyl arginate. A preferred cationic compound is ethyl lauroyl arginate.

In some embodiments, other quaternary ammonium structures, such as cetylpyridinium chloride, may be used together with or in place of the cationic amino/ester or cationic amino/amide.

In some embodiments, the cationic compound is included in a concentrate in an amount from about 0.01 to about 10 wt. %, from about 0.1 to about 5 wt. %, or from about 0.25 to about 2 wt. %. In certain embodiments, the compositions can be optionally free of the cationic compound.

In some embodiments, the cationic compound is included in a ready-to-use solution in an amount from about 1 to about 100 ppm, from about 1 to about 50 ppm, or from about 1 to about 5 ppm.

Additional Functional Materials

In some embodiments, the compositions may include additional functional materials. Exemplary additional functional materials include surfactants, solvents, pH adjusters, buffers, corrosion inhibitors, chelating agents, polymers, hydrotropes, rheology modifiers, dyes, and fragrances.

Surfactants

In some embodiments, the present compositions may optionally include one or more surfactants. Surfactants are beneficial for increasing the surface activity of the present antimicrobial compositions on surfaces, helping to emulsify or remove soils on the surface so that the antimicrobial agent can get to the surface, suspending the present compositions in water as an emulsion or microemulsion, lending foaming or antifoaming properties to the composition, and solubilizing the raw materials into solution. Exemplary surfactants include nonionic, anionic, cationic, amphoteric, zwitterionic surfactants, and combinations thereof, which are commercially available from a number of sources. For a discussion of surfactants, see Kirk-Othmer, Encyclopedia of Chemical Technology, Third Edition, volume 8, pages 900-912.

Useful anionic surfactants include, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. Suitable anionics are sodium alkylarylsulfonate, alpha-olefin sulfonate, and fatty alcohol sulfates.

Useful nonionic surfactants include those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene glycol ethers of fatty alcohols. Other suitable nonionic surfactants include alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer such as those commercially available under the trademark PLURONIC (BASF-Wyandotte), and the like; ethoxylated amines and ether amines commercially available from Tomah Corporation and other like nonionic compounds. Silicone surfactants such as the ABIL B8852 (Goldschmidt) can also be used.

Useful cationic surfactants include amines such as primary, secondary and tertiary monoamines with C6-24 alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl(C6-C24)dimethylbenzyl ammonium chloride, n-tetradecyldimethylbenzylammonium chloride monohydrate, a naphthalene-substituted quaternary ammonium chloride such as dimethyl-1-naphthylmethylammonium chloride, and the like; and other like cationic surfactants.

Surfactants may be present in the present compositions in a concentrate in amounts from about 1 to about 30 wt. %, about 1 to 20 wt. %, about 1 to 10 wt. %, or about 1 to 5 wt. %. Surfactants may be present in the present compositions in a ready-to-use composition in amounts from about 0.001 to about 10 wt. %, from about 0.001 to about 5 wt. %, or from about 0.001 wt. % to about 1 wt. %.

Solvents

In some embodiments, the present compositions may optionally include one or more solvents. The primary carrier is typically water. In some embodiments, the present compositions may include water plus another solvent. In some embodiments, the present compositions may be free of water and only include non-aqueous solvents. Exemplary solvents include alcohols such as ethanol, isopropanol, n-propanol, and the like; polyols such as propylene glycol, polyethyleneglycol, glycerol, sorbitol, and the like; short chain organic acids such as acetic acid; and hydrotropes like lysine. Any of these compounds may be used singly or in combination with other organic or inorganic constituents or, in combination with water or in mixtures thereof.

Water may be present in the present compositions in a concentrate in amounts from about 0 to about 90 wt. %, about 0 to about 50 wt. %, about 0 to about 20 wt. %, or about 0 to about 10 wt. %. Water may be present in the present compositions in a ready-to-use composition in amounts from about 0 to about 99.99 wt. %, from about 50 wt. % to about 99.99 wt. %, from about 75 wt. % to about 99.99 wt. %, or from about 90 wt. % to about 99.99 wt. %. When water is the primary carrier, additional solvents may be present in the present compositions in a concentrate in amounts from about 0 to about 60 wt. %, about 20 wt. % to about 60 wt. %, or about 40 wt. % to about 60 wt. %. When water is the primary carrier, additional solvents may be present in the present compositions in a ready-to-use composition in amounts from about 0 to about 60 wt. %, from about 0 to about 30 wt. %, or from about 0 to about 10 wt. %.

When the composition is used in a clean-in-place process, the composition may be injected into the clean-in-place process as a concentrate where it is diluted within the equipment by the solution circulating in the clean-in-place process. The composition can also be injected into the clean-in-place process as a ready-to-use solution.

In some embodiments, the present compositions are completely free of water. In some embodiments, the present compositions are free of added water, but may include water that is part of individual raw materials. In such cases, non-aqueous solvents may be present in the present compositions in a concentrate in amounts from about 5 to about 70 wt. %, about 30 wt. % to about 70 wt. %, or about 50 wt. % to about 70 wt. %. In such non-aqueous embodiments, the non-aqueous solvents may be present in the present compositions in a ready-to-use composition in amounts from about 5 wt. % to about 70 wt. %, from about 50 wt. % to about 70 wt. %, or from about 5 wt. % to about 20 wt. %.

pH Adjusters

In some embodiments, the present compositions may optionally include one or more pH adjusters. While the present compositions have antimicrobial activity over a wide pH range, for some applications, it may be desirable to adjust the pH of the composition to match the pH of the environment being treated. For example, when treating a food surface, the pH of the composition is preferably around neutral or pH 6-8. The pH adjuster can also be used to adjust the pH of a fluid stream or system that the cleaning compositions are being added to in order to bring such system out of an undesirable pH range.

The pH of the composition can be adjusted using one or more acids or bases such as hydroxides, sodium hydroxide, potassium hydroxide, carbonates such as potassium or sodium carbonate or bicarbonate, ethanolamines (e.g., monoethanolamine, diethanolamine, triethanolamine), inorganic acids such as hydrochloric acid, nitric acid, sulfuric acid, sulfamic acid, phosphoric acid, and organic acids such as mono-, di-, and tricarboxylic acids such as formic, butyric, valeric, caproic, itaconic, trichloroacetic, oxalic, terephthalic, citric, acetic, lactic, malonic, maleic, succinic, hydroxyl succinic, adipic, octanoic, fumaric, methacrylic, methylsulfamic, propionic, gluconic, glutamic, glutaric, benzoic, tartaric, hydroxyacetic, salicylic, and methane sulfonic acid.

In some embodiments, the concentrate or the ready to use composition has a pH in the range of about 2 to about 14, about 3 to about 10, about 4 to about 9, about 6 to about 8, about 2 to about 7, about 2 to about 6, about 2 to about 4, about 7 to about 14, about 7 to about 10, about 8 to about 10, about 8.5 to about 14, about 9 to about 12, about 10 to about 12, about 7 or greater, about 8 or greater, about 8.5 or greater, about 9 or greater, about 10 or greater, about 11 or greater, about 12 or greater, about 7 or less, about 6 or less, about 5 or less, or about 4 or less.

pH adjusters may be present in the present compositions in a concentrate in amounts from about 0 to about 15 wt. %, about 1 wt. % to about 10 wt. %, or about 3 wt. % to about 10 wt. %. pH adjusters may be present in the present compositions in a ready-to-use composition in amounts from about 0 to about 15 wt. %, from about 0.1 wt. % to about 10 wt. %, or from about 0.2 wt. % to about 5 wt. %.

Buffers

In some embodiments, the present compositions may optionally include one or more buffers to maintain the pH of the composition within a desired range. Non-limiting examples of buffers include 3-(N-morpholino)propanesulfonic acid (MOPS), piperazine-N,N'-bis(2-ethanesulfonic acid) (PIPES), 2-(N-morpholino)ethanesulfonic acid (MES), N-(2-Acetamido)iminodiacetic acid (ADA), sodium phosphate, sodium citrate, sodium formate, sodium malate, sodium acetate, or sodium diacetate. Exemplary buffers are or include phosphate salts, citrate salts, formate salts, malate salts, or acetate salts. Exemplary buffers are or include sodium phosphate, sodium citrate, sodium formate, sodium malate, or sodium acetate.

Buffers may be present in the present compositions in a concentrate in amounts from about 0 to about 10 wt. %, or about 0 to about 5 wt. %. Buffers may be present in the present compositions in a ready-to-use composition in amounts from about 0 to about 10 wt. %, from about 0 to about 5 wt. %, or from about 0.01 wt. % to about 1 wt. %.

Corrosion Inhibitor

In some embodiments, the present compositions may optionally include one or more corrosion inhibitors. Non-limiting examples of corrosion inhibitors include a source of aluminum ions, a source of zinc ions, a source of magnesium ions, and alkali metal silicates (or hydrate thereof). More specific examples of corrosion inhibitors include aluminum salts such as sodium aluminate, aluminum bromide, aluminum chlorate, aluminum chloride, aluminum iodide, aluminum nitrate, aluminum sulfate, aluminum acetate, aluminum formate, aluminum tartrate, aluminum lactate, aluminum oleate, aluminum bromate, aluminum borate, aluminum potassium sulfate, aluminum zinc sulfate, and aluminum phosphate, zinc chloride, zinc sulfate, zinc nitrate, zinc iodide, zinc thiocyanate, zinc fluorosilicate, zinc dichromate, zinc chlorate, sodium zincate, zinc gluconate, zinc acetate, zinc benzoate, zinc citrate, zinc lactate, zinc formate, zinc bromate, zinc bromide, zinc fluoride, zinc fluorosilicate, and zinc salicylate, magnesium acetate, magnesium benzoate, magnesium bromide, magnesium bromate, magnesium chlorate, magnesium chloride, magnesium chromate, magnesium citrate, magnesium formate, magnesium hexafluorosilicate, magnesium iodate, magnesium iodide, magnesium lactate, magnesium molybdate, magnesium nitrate, magnesium perchlorate, magnesium phosphinate, magnesium salicylate, magnesium sulfate, magnesium sulfite, magnesium thiosulfate, a hydrate thereof, and a mixture thereof. These salts can be provided as hydrated salts or anhydrous salts, sodium silicate, potassium silicate, and mixtures, salts, and hydrates thereof.

Corrosion inhibitors may be present in the present compositions in a concentrate in amounts from about 0 to about 10 wt. %, or about 0 to about 5 wt. %. Corrosion inhibitors may be present in the present compositions in a ready-to-use composition in amounts from about 0 to about 10 wt. %, from about 0 to about 5 wt. %, or from about 0.01 wt. % to about 1 wt. %, or up to 500 ppm.

Chelating Agents

In some embodiments, the present compositions may optionally include one or more chelating agents. Non-limiting examples of chelating agents include aminocarboxylic acids, condensed phosphates, polymeric polycarboxylates, and the like.

Examples of condensed phosphates include sodium and potassium orthophosphate, sodium and potassium pyrophosphate, sodium and potassium tripolyphosphate, sodium hexametaphosphate, and the like. Examples of polymeric polycarboxylates include those having pendant carboxylate (—CO2-) groups such as polyacrylic acid, maleic acid, maleic/olefin copolymer, sulfonated copolymer or terpolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers. Examples of chelating agents also include amino tri(methylene phosphonic) acid, 1-hydroxyethylidene-1,1-diphosphonic acid, diethylenetriaminepenta(methylene phosphonic) acid, alanine-N,N-diacetic acid, diethylenetriaminepentaacetic acid, or alkali metal salts thereof, or mixtures thereof. In this embodiment, alkali metal salts include sodium, potassium, calcium, magnesium, or mixtures thereof.

Chelating agents may be present in the present compositions in a concentrate in amounts from about 0 to about 10 wt. %, or about 0 to about 5 wt. %. Chelating agents may be present in the present compositions in a ready-to-use composition in amounts from about 0 to about 10 wt. %, from about 0 to about 5 wt. %, or from about 0.01 wt. % to about 1 wt. % or up to 500 ppm.

Thickener

In some embodiments, the present compositions may optionally include one or more thickeners. Non-limiting examples of thickeners include polymeric thickeners including, but not limited to, polymers or natural polymers or gums derived from plant or animal sources. Such materials may be polysaccharides such as large polysaccharide molecules having substantial thickening capacity. Thickeners also include clays. Other polymeric thickeners include carboxylated vinyl polymers such as polyacrylic acids and sodium salts thereof, ethoxylated cellulose, polyacrylamide thickeners, cross-linked, xanthan compositions, sodium alginate and algin products, hydroxypropyl cellulose, hydroxyethyl cellulose, and other similar aqueous thickeners that have some substantial proportion of water solubility. Exemplary polysaccharides include xanthan gum derivatives.

Thickeners may be present in the present compositions in a concentrate in amounts from about 0 to about 10 wt. % or about 0 to about 5 wt. %. Thickeners may be present in the present compositions in a ready-to-use composition in amounts from about 0 to about 10 wt. %, from about 0 to about 5 wt. %, or from about 0.01 wt. % to about 1 wt. % or up to 500 ppm.

Dyes and Fragrances

In some embodiments, the present compositions may optionally include a dye or a fragrance. Dyes may be included to alter the appearance of the composition, as for example, Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the compositions include, for example, terpenoids such as citronellol, aldehydes such as amyl cinnamaldehyde, a jasmine such as C1S-jasmine or jasmal, vanillin, and the like.

In some embodiments, the compositions are considered GRAS or "generally recognized as safe." In some embodiments, the composition are approved for use in animal feed, pet food, or human food. In some embodiments, the compositions are considered to be food grade. In some embodiments, the composition comprises, consists essentially of, or consists of food grade materials. In some embodiments, the compositions are considered to be feed additive compatible. In some embodiments, the compositions comprise, consist essentially of, or consist of feed additive compatible ingredients. In some embodiments, the compositions comprise ingredients that are considered suitable for direct, indirect, or incidental food contact.

The Food, Drug, and Cosmetic Act provides a partial list of food additive materials at 21 C.F.R. parts 573 and 579. A partial listing of substances that are considered GRAS is found at 21 C.F.R. parts 582 and 584. The Official Publication of the Association of American Feed Control Officials (AAFCO) includes a list of approved animal food (feed) ingredients. Many of the ingredients in the AAFCO Official Publication are not approved food additives or considered GRAS but are nevertheless recognized by the FDA as approved for animal feed as long as there are no safety concerns. In some embodiments, suitability for direct, indirect, or incidental food contact is determined by the United States Food and Drug Administration.

In some embodiments, the compositions can be provided in the form of oils, solutions, emulsions, microemulsions, multi-use solid blocks, single-use solid blocks, tablets, gels, pastes, or combinations thereof.

In some embodiments, it is desirable for the compositions to be provided as pumpable compositions (e.g., liquids) for ease of use. When the compositions are provided as solids, they are typically first dissolved in water or solvent for ease of use and application.

The concentrate or the use solution can be provided as a neutral solution (e.g., pH of about 5 to about 7), an acidic solution (e.g., pH 3 to about pH 7) or an alkaline solution (e.g., about pH 8 to about pH 11). Additionally, the concentration or the ready-to-use solution may encounter a pH change while it is being used. One of the benefits of the disclosed compositions is that they maintain antimicrobial activity over a broad pH range. Accordingly, if the composition is introduced to a CIP system or applied to a surface and thereafter encounters a pH change that increases or decreases the pH, the antimicrobial activity of the composition would be expected to remain.

The compositions may be provided as concentrates or ready-to-use compositions. A concentrate refers to a composition that is further diluted before being used. A ready-to-use composition refers to a composition that is not further diluted before being used. The concentrates may be diluted with any amount but are typically diluted in the range of about 1:100 to about 1:1500 parts concentrate to water. For cleaning compositions, the compositions are typically more concentrated. For example, cleaning compositions may be diluted to ratios of about 1:100 to about 1:500, or about 1:100 to about 1:300. For sanitizing compositions, the dilutions are typically greater than about 1:100 up to about 1:1500. An exemplary dilution is about 1-ounce concentrate to about 6 gallons of water ($2.957\times10\text{-}2$ liters to about 3.785 liters or about 29.57 ml to about 3785.41 ml). This ratio is approximately 1:768 parts concentrate to water. The compositions may also be diluted with solvents other than water.

Applications

The disclosed compositions can be used anywhere that antimicrobial sanitizers and disinfectants may be used. Non-limiting examples of such applications include clean-in-place cleaning, clean out of place cleaning, manual cleaning, hard surface cleaning, membrane cleaning, food applications such as poultry and red meat surface treatments, ready-to-eat meat treatments, egg treatments, and fruit and vegetable washes and sprays, flume treatments, and crop and orchard sprays, laundry applications, cooling towers, aseptic packaging, endoscope reprocessing, surgical instruction disinfecting, dairy applications, human and animal patient applications.

Clean-In-Place Cleaning

When the present compositions are used as part of a clean-in-place operation, the clean-in-place system is first cleaned with either an acidic or alkaline cleaner or both. Exemplary cleaning compositions include a 10 wt. % sodium hydroxide solution or a 1 wt. % strong acid solution. The cleaning solution may be sprayed, circulated, or recirculated within the clean-in-place system. The cleaning cycle may last from 10 to 40 minutes, from 10 to 30 minutes, or from 10 to 20 minutes. The cleaning cycle may occur at room temperature or at elevated temperatures. In some embodiments, the cleaning solution is drained from the clean-in-place system. In some embodiments, the clean-in-place system is rinsed after cleaning. In some embodiments, there are two cleaning steps, an acid and an alkaline, and an optional rinse in between the two cleaning steps.

One of the challenges with sanitizers in clean-in-place systems is that an incomplete drain and/or rinse of the cleaning solution can cause large variations in the pH of the system when the sanitizer is applied. For example, a clean-in-place system that has been sufficiently drained and rinsed after a cleaning cycle using sodium hydroxide would be expected to have a significantly lower pH than if the caustic is not sufficiently drained or rinsed. This increase in pH could render certain sanitizing compositions to be less effective. One of the benefits of the present compositions is that they have antimicrobial activity over a broad pH range and would be unaffected by such variations in pH due to changes in the draining or rinsing of the cleaning composition. Accordingly, in some embodiments, the present compositions may be added to the clean-in-place system (1) after the cleaning composition has been drained and rinsed from the system, (2) after the cleaning composition has been drained but eliminating the rinse step, (3) before the cleaning composition has been drained, or (4) together with the cleaning composition.

The present compositions may be sprayed, circulated, and/or recirculated within the clean-in-place system.

The present compositions may be applied, circulated, or recirculated within the clean-in-place system for 5 to 120 minutes, for 10 to 60 minutes, or for 20 to 40 minutes.

In some embodiments, after the present compositions have been applied, circulated, or recirculated within the clean-in-place system, they may be drained from the system.

The draining may be followed by a rinse step. In some embodiments, the present compositions may be allowed to remain within the clean-in-place system (i.e., not drained or rinsed). Especially in situations where the materials in the present compositions are selected to be food or feed grade, the materials degrade into food or feed grade materials and are thus not harmful to humans or animals. Moreover, in certain applications, the presence of the present composition within the manufacturing equipment may be beneficial to the manufacturing process. For example, in bioethanol plants, the present compositions may be beneficial to the fermentation process by helping to suppress bacterial growth, which in turn increases the ethanol yield.

Exemplary surfaces for clean-in-place cleaning include tanks, pipes, nozzles, spray dryers, evaporators, condensers, membranes, endoscopes, cooling towers. Such equipment may be found in applications for dairy, brewery, food and beverage, and biofuel generation.

Clean Out of Place Cleaning; Manual Cleaning; Hard Surface Cleaning

Certain equipment and surfaces may be cleaned manually or cleaned "out of place". The present compositions may be applied to such equipment or surfaces by spraying, soaking, misting, fogging, dripping, or wiping. In some embodiments, the present compositions may be incorporated into a disposable woven or non-woven wipe. The present compositions may be applied to the equipment or surface at room temperature, at elevated temperature, or at room temperature and then heated to an elevated temperature. The present compositions are allowed to remain on the equipment or surface for at least 1 minute, at least 5 minutes, or at least 10 minutes depending on the concentration and temperature of the composition. After remaining on the equipment or surface, the present compositions may be wiped off, rinsed off, or allowed to remain on the surface indefinitely. In some embodiments, the present compositions are considered food surface contact sanitizers.

Exemplary applications for the present compositions as a clean out of place cleaner, manual cleaner, or hard surface cleaner include transportation equipment (e.g., milk tankers, livestock trucks, trailers and train cars for transporting finished product), animal rearing surfaces such as milking stalls, barns, and pens, retail surfaces (e.g., knives, cutting boards, butcher blocks, butcher equipment, meat slicers, refrigeration and freezer equipment, storage and display cases), restaurant surfaces (e.g., counters, ovens, fryers, utensils, tables), bathroom surfaces, human and veterinary heath locations (e.g., dental offices, operating suites, exam rooms, waiting rooms, patient tables, tools, equipment, sensitive equipment like gaskets and seals, processing equipment, tools, slaughtering equipment, surgical instruments, environmental surfaces such as floors, walls, drains, parking pads, high touch surfaces, and the like.

Food Applications

The present compositions may be applied directly to human or animal food such as pet food, animal feed, poultry, red meat, ready to eat meat, eggs, milk, fruits, vegetables, orchards, gardens, agricultural land crops, and food packaging including modified atmosphere packaging and aseptic packaging.

The present compositions may be applied to meat including poultry and red meat. For poultry applications, the present compositions may be used to reduce microbial contamination on poultry during processing. The compositions may be spray applied to poultry, may be applied using an inside-outside bird washer, or may be used in poultry chillers. For red meat applications, the present compositions may be applied to whole muscle meat, primal cuts, or sub-primal cuts of red meat.

The present compositions may be applied to ready to eat meat. Ready to eat meat including sausage and cold cuts is at high risk for antimicrobial contamination. Unlike whole muscle meat (e.g., a steak, or chicken breast, or a roast) where the interior of the meat has not been exposed, ready to eat meat has been ground, processed, and commingled with other meat. If contaminated meat is used to make ready to eat meat, it will contaminate the finished product and the processing equipment used to make the finished product, thereby perpetuating the contamination. The present compositions can be applied to the finished ready to eat meat product during and after manufacturing. The present compositions can also be applied to the processing equipment to make the ready to eat meat including the slicers and grinders. In some embodiments, the present compositions are applied to the ready to eat meat shortly before packaging.

The present compositions may be applied to fruits and vegetables as a field treatment, transportation process water treatment, flume treatment, or wash. The present compositions may be used in a method to clean, wash, cool, heat, cook, transport, or otherwise process fruits, vegetables, nuts, seeds, grains, and other produce before packing or shipping. In some embodiments, the present compositions are included in an aqueous stream or flume to transport the produce from one processing location to another. In some embodiments, the water used in produce processing is recycled. The present compositions may be applied to produce in the field during harvesting to stop microbial growth from occurring during transportation from the field to a processing plant. Such field application may be by spraying, misting, or dipping.

The present compositions may be applied as a produce wash or spray such as in misting systems at a grocery store or as a consumer produce wash for use at home.

The present compositions are typically applied to fruits, vegetables, and other produce at room temperature, at chilled temperatures, or at elevated temperatures. In some embodiments, the present compositions are applied to produce at cold temperatures, room temperature, elevated temperatures, or as steam or vapor. The present compositions are applied to the produce and then allowed to remain on the produce. In some embodiments, the present compositions may be rinsed off of the produce after a period of time such as 1 minutes, 5 minutes, or 10 minutes.

The present compositions may be applied to growing plants including orchards, gardens, hydroponic plants, greenhouse plants, and agricultural land crops. The present compositions may be applied to growing plants by spraying, wiping, misting, fogging, watering at the root or within the hydroponic aqueous medium, or by injection into the plant. The present compositions can also be used to prevent unwanted bacterial growth in the watering systems of such plants, including hydroponic aqueous system, watering trucks, or irrigation systems.

The present compositions may be applied to food shortly before packaging or to the food packaging itself shortly before packaging. Exemplary food packaging includes shrink wrap films, modified atmosphere packaging, polymeric clam shell packaging, and aseptic packaging. When the present compositions are applied to either the food or the packaging shortly before the food is packaged and then allowed to remain on the food inside of the packaging, the present compositions provide a protective antimicrobial effect against microorganism growth within the packaging.

The benefits of this ongoing antimicrobial activity is ongoing protection against pathogenic microorganisms leading to better food safety, and protection against spoilage or organoleptic microorganisms leading to an extended product shelf life.

When used with food packaging, the present compositions can be applied directly to the food shortly before packaging, for example, by coating, spraying, dipping, misting, or fogging the compositions onto the food product. After the compositions are applied, the food product is packaged and the packaging closed or sealed. In some embodiments, the composition is applied to the packaging, for example by spraying, squirting, misting, fogging, dipping, coating, impregnating or diffusing the composition into the packaging. The food product is then placed inside of the packaging and the package is sealed. The contact between the packaging and the food product transfers the compositions to the food product.

Human and Animal Applications

In certain embodiments, the present compositions are applied directly to humans or animals. Such applications include use as hand sanitizer, a surgical scrub, a patient prep, a teat wash or dip for dairy animals, or a foot, boot, or hoof wash for humans or livestock around a farm.

When used as a hand sanitizer, surgical scrub, or patient prep composition (for human or animal medical or veterinary procedures), the compositions are applied directly to the skin and rubbed, scrubbed, or allowed to remain on the skin for a period of time. In such applications, the compositions would be expected to be applied to humans or animals at room temperature.

When used a teat wash or dip for dairy animals, the composition may be formulated as a water-thin wash or as a thickened dip that forms a barrier on the teat to protect against mastitis after milking. The present compositions are beneficial as teat washes or dips because the materials degrade into food grade or feed grade material. Such food grade or feed grade materials will not render milk unusable if residual product is mixed with milk during the next milking.

The present compositions can be used as a foot, boot, or hoof wash around a farm. For example, on a dairy farm, bacteria enter the milking parlor on the hooves and boots of the animals and farmers. This bacteria can contaminate milk, lead to mastitis infections, and cause hoof infections and lameness in animals. The present compositions can be used as a foot bath that animals and farmers walk through to remove debris and kill bacteria. For such applications, the compositions can be formulated with a surfactant to help remove dirt and debris. The surfactant can also provide foaming as a visual indicator that the compositions are present in the foot bath.

When applied to human or animal skin, the present compositions may be formulated with emollients, moisturizers, or humectants to promote skin health.

EXAMPLES

Example 1

Example 1 was a preliminary screen of various compositions for antimicrobial efficacy against *acetobacter* and *lactobacillus* and yeast. For this example, the compositions were applied for 1 minute at 50° C. or 60° C. to *Acetobacter aceti* (ATCC 15973), *Lactobacillus brevis* (ATCC 14869), or *Saccharomyces cerevisiae* (ATCC 834). The results are shown in Table 1.

TABLE 1

| Ethyl Lauroyl Arginate (ppm) | Octanoic Acid (ppm) | Nonanoic Acid (ppm) | pH | Time (s) | Temp ° C. | Microbe | % reduction |
|---|---|---|---|---|---|---|---|
| 0 | 150 | 0 | 4 | 50 | 60 | lacto | 100.000% |
| 0 | 200 | 0 | 4 | 50 | 60 | lacto | 100.000% |
| 50 | 0 | 0 | 10 | 50 | 60 | lacto | 100.000% |
| 5 | 0 | 125 | 9 | 60 | 50 | aceto | 99.995% |
| 5 | 0 | 125 | 9 | 60 | 50 | aceto | 99.983% |
| 0 | 125 | 0 | 4 | 60 | 50 | lacto | 100.000% |
| 50 | 0 | 0 | 4 | 50 | 60 | lacto | 100.000% |
| 5 | 150 | 0 | 9 | 60 | 50 | aceto | 99.999% |
| 25 | 100 | 0 | 4 | 60 | 50 | aceto | 100.000% |
| 25 | 150 | 0 | 4 | 60 | 50 | aceto | 100.000% |
| 50 | 100 | 0 | 4 | 60 | 50 | aceto | 100.000% |
| 50 | 150 | 0 | 4 | 60 | 50 | aceto | 100.000% |
| 50 | 150 | 0 | 10 | 60 | 50 | aceto | 100.000% |
| 50 | 100 | 0 | 10 | 60 | 50 | aceto | 100.000% |
| 0 | 125 | 0 | 9 | 60 | 50 | yeast | 100.000% |
| 25 | 0 | 0 | 10 | 50 | 60 | lacto | 100.000% |
| 25 | 150 | 0 | 10 | 60 | 50 | aceto | 100.000% |
| 10 | 200 | 0 | 10 | 60 | 50 | aceto | 100.000% |
| 10 | 150 | 0 | 10 | 60 | 50 | aceto | 100.000% |
| 10 | 200 | 0 | 10 | 60 | 50 | aceto | 100.000% |
| 10 | 150 | 0 | 10 | 60 | 50 | aceto | 100.000% |
| 5 | 200 | 0 | 10 | 60 | 50 | aceto | 100.000% |
| 5 | 150 | 0 | 10 | 60 | 50 | aceto | 100.000% |
| 5 | 100 | 0 | 4 | 60 | 50 | aceto | 100.000% |
| 5 | 50 | 0 | 4 | 60 | 50 | aceto | 100.000% |
| 50 | 150 | 0 | 10.5 | 60 | 50 | aceto | 99.999% |
| 25 | 100 | 0 | 10.5 | 60 | 50 | aceto | 99.999% |
| 25 | 200 | 0 | 10 | 60 | 50 | aceto | 99.999% |
| 15 | 150 | 0 | 4 | 60 | 50 | aceto | 99.999% |
| 5 | 150 | 0 | 4 | 60 | 50 | aceto | 99.999% |
| 5 | 100 | 0 | 9 | 60 | 50 | aceto | 99.998% |
| 0 | 0 | 125 | 9 | 60 | 50 | aceto | 99.998% |

TABLE 1-continued

| Ethyl Lauroyl Arginate (ppm) | Octanoic Acid (ppm) | Nonanoic Acid (ppm) | pH | Time (s) | Temp ° C. | Microbe | % reduction |
|---|---|---|---|---|---|---|---|
| 3 | 0 | 200 | 4 | 60 | 50 | aceto | 100.000% |
| 25 | 0 | 0 | 4 | 50 | 60 | lacto | 99.999% |
| 5 | 0 | 0 | 9 | 60 | 50 | lacto | 99.999% |
| 25 | 100 | 0 | 10 | 60 | 50 | aceto | 99.999% |
| 200 | 0 | 0 | 7 | 60 | 50 | aceto | 99.999% |
| 5 | 0 | 0 | 9 | 60 | 50 | aceto | 99.981% |
| 5 | 0 | 0 | 9 | 60 | 50 | aceto | 99.922% |
| 3 | 200 | 0 | 4 | 60 | 50 | aceto | 100.000% |
| 2.5 | 200 | 0 | 4 | 60 | 50 | aceto | 99.928% |
| 200 | 0 | 0 | 10 | 60 | 50 | aceto | 99.998% |
| 3 | 0 | 200 | 9 | 60 | 50 | aceto | 100.000% |
| 5 | 50 | 0 | 9 | 60 | 50 | aceto | 99.465% |
| 2.5 | 125 | 0 | 9 | 60 | 50 | aceto | 100.000% |
| 0 | 200 | 0 | 4 | 60 | 50 | aceto | 99.998% |
| 2.5 | 100 | 0 | 9 | 60 | 50 | aceto | 99.999% |
| 0 | 200 | 0 | 7 | 60 | 50 | aceto | 99.993% |
| 2.5 | 100 | 0 | 9 | 60 | 50 | aceto | 99.989% |
| 2.5 | 0 | 0 | 9 | 60 | 50 | aceto | 99.891% |
| 0 | 125 | 0 | 9 | 60 | 50 | aceto | 99.998% |
| 5 | 0 | 125 | 4 | 60 | 50 | lacto | 100.000% |
| 0 | 100 | 0 | 9 | 60 | 50 | aceto | 99.999% |
| 0 | 100 | 0 | 9 | 60 | 50 | aceto | 99.998% |
| 5 | 0 | 0 | 9 | 60 | 50 | yeast | 99.888% |
| 25 | 0 | 0 | 9 | 60 | 50 | aceto | 99.808% |
| 2.5 | 125 | 0 | 9 | 60 | 50 | lacto | 99.785% |
| 50 | 0 | 0 | 10 | 60 | 50 | aceto | 99.763% |
| 0 | 200 | 0 | 4 | 60 | 50 | aceto | 99.998% |
| 0 | 0 | 125 | 4 | 60 | 50 | lacto | 100.000% |
| 5 | 0 | 125 | 9 | 60 | 50 | lacto | 99.998% |
| 25 | 0 | 0 | 10 | 60 | 50 | aceto | 99.241% |
| 0 | 200 | 0 | 4 | 60 | 50 | aceto | 99.996% |
| 50 | 100 | 0 | 4 | 60 | 20 | aceto | 99.238% |
| 5 | 0 | 0 | 4 | 60 | 50 | lacto | 98.844% |
| 2.5 | 100 | 0 | 9 | 60 | 50 | lacto | 98.723% |
| 3 | 150 | 0 | 4 | 60 | 50 | aceto | 99.999% |
| 0 | 125 | 0 | 9 | 60 | 50 | lacto | 97.813% |
| 0 | 0 | 125 | 9 | 60 | 50 | lacto | 96.125% |
| 2.5 | 125 | 0 | 4 | 60 | 50 | lacto | 92.806% |
| 50 | 0 | 0 | 4 | 60 | 50 | aceto | 98.491% |
| 2.5 | 150 | 0 | 4 | 60 | 50 | aceto | 0.000% |
| 0 | 150 | 0 | 4 | 60 | 50 | aceto | 86.207% |
| 0 | 100 | 0 | 5 | 60 | 50 | aceto | 54.967% |
| 10 | 200 | 0 | 4 | 60 | 20 | aceto | 63.243% |
| 25 | 0 | 0 | 4 | 60 | 50 | aceto | 32.759% |
| 15 | 100 | 0 | 4 | 60 | 20 | aceto | 29.730% |
| 5 | 200 | 0 | 4 | 60 | 20 | aceto | 10.811% |
| 3 | 125 | 0 | 4 | 60 | 50 | aceto | 99.633% |
| 2.5 | 125 | 0 | 4 | 60 | 50 | aceto | 99.085% |
| 2.5 | 125 | 0 | 4 | 60 | 50 | aceto | 0.000% |
| 2.5 | 100 | 0 | 4 | 60 | 50 | aceto | 99.679% |
| 2.5 | 100 | 0 | 4 | 60 | 50 | aceto | 89.910% |
| 0 | 100 | 0 | 4 | 60 | 50 | aceto | 0.000% |
| 0 | 100 | 0 | 4 | 60 | 50 | aceto | 0.000% |
| 3 | 0 | 200 | 4 | 60 | 50 | lacto | 100.000% |
| 3 | 0 | 200 | 9 | 60 | 50 | lacto | 99.996% |
| 0 | 0 | 125 | 9 | 60 | 50 | yeast | 99.954% |
| 5 | 0 | 125 | 9 | 60 | 50 | yeast | 99.650% |

Example 2

Example 2 was a preliminary corrosion study on various surfaces. For this test, coupons were placed into a solution for 8 minute cleaning cycles, 6 circuits per day, at 80° C. (176° F.). The solution was either water and acetic acid, adjusted to a pH of 3.7, or 10% deionized water, 40% nonanoic acid, 38% propylene glycol, 11.15% glycerine, 0.25% lysine, and 0.60% ethyl lauroyl arginate, adjusted to a pH of 3.7 with acetic acid. The solution temperature was 80° C. and the solution was circulated around the coupons with agitation at 550 rpms. When used alone, the acetic acid caused roughly 2 mpy corrosion of the coupons. When the composition of the present disclosure with the ethyl lauroyl arginate was added to the composition, the corrosion was reduced by more than half. The results are shown in Table 2.

TABLE 2

| Material | Product | Coupon | Mass day 0 | Mass final | Mass change | mpy |
|---|---|---|---|---|---|---|
| 1018 carbon steel | Acetic acid and water | 0 | 21.2977 | 21.2319 | −0.0658 | −2.08 |
| 1018 carbon steel | Acetic acid and water | 1 | 21.1107 | 21.0476 | −0.0631 | −1.99 |
| 1018 carbon steel | Acetic acid and water | 2 | 21.2591 | 21.1983 | −0.0608 | −1.92 |
| 1018 carbon steel | Acetic acid and water | 3 | 21.3517 | 21.2898 | −0.0619 | −1.95 |
| 1018 carbon steel | Acetic acid and water | 4 | 21.3629 | 21.2999 | −0.063 | −1.99 |
| 1018 carbon steel | Acetic acid and water | 5 | 21.2383 | 21.1691 | −0.0692 | −2.18 |
| 1018 carbon steel | ethyl lauroyl arginate formula and acetic acid | 6 | 21.3715 | 21.3467 | −0.0248 | −0.78 |
| 1018 carbon steel | ethyl lauroyl arginate formula and acetic acid | 7 | 21.3652 | 21.3398 | −0.0254 | −0.80 |
| 1018 carbon steel | ethyl lauroyl arginate formula and acetic acid | 8 | 21.2461 | 21.2216 | −0.0245 | −0.77 |
| 1018 carbon steel | ethyl lauroyl arginate formula and acetic acid | 9 | 21.3672 | 21.3432 | −0.024 | −0.76 |
| 1018 carbon steel | ethyl lauroyl arginate formula and acetic acid | 10 | 21.1903 | 21.1664 | −0.0239 | −0.75 |
| 1018 carbon steel | ethyl lauroyl arginate formula and acetic acid | 11 | 21.4349 | 21.4153 | −0.0196 | −0.62 |

Example 3

Example 3 tested concentrations of nonanoic acid alone for antimicrobial efficacy against *acetobacter* and *lactobacillus*. For this example, the compositions were applied for the recorded time and temperature to suspensions of *Acetobacter aceti* (ATCC 15973), or *Lactobacillus brevis* (ATCC 14869). After the period of time, a neutralizer was added to quench the reaction. The remaining solution was plated and counted for colonies and compared to the untreated control. The log reduction was recorded in the table below. The information in the column labeled "solution" describes the solution environment that was used for a test. For example, the solution may have included 0.5% or 1% sodium bicarbonate. The solution may have included multi-day old used clean-in-place solution from a plant that included sodium carbonate (labeled "used CIP"). The pH of the solution was adjusted with sodium carbonate.

The results in Table 3 show that nonanoic acid was effective at reducing gram positive and gram negative bacteria under various times, temperatures, pHs, and solution conditions. It was unexpected that nonanoic acid would be an effective antimicrobial at pH values above 7.

TABLE 3

| Nonanoic Acid (ppm) | pH | Time (s) | Temp ° C. | Microbe | Log Reduction | % reduction | Solution |
|---|---|---|---|---|---|---|---|
| | 8.7 | 60 | 45 | lacto | 1.71 | 98.045% | 0.5% sodium bicarbonate |
| | 8.7 | 120 | 45 | lacto | 2.92 | 99.880% | 0.5% sodium bicarbonate |
| | 8.7 | 300 | 45 | lacto | 7.64 | 100.000% | 0.5% sodium bicarbonate |
| | 8.7 | 600 | 45 | lacto | 7.64 | 100.000% | 0.5% sodium bicarbonate |
| 200 | not adjusted | 60 | 45 | lacto | 3.02 | 99.905% | 0.5% sodium bicarbonate |
| 200 | not adjusted | 120 | 45 | lacto | 6.34 | 100.000% | 0.5% sodium bicarbonate |
| 200 | not adjusted | 300 | 45 | lacto | 7.64 | 100.000% | 0.5% sodium bicarbonate |
| 200 | not adjusted | 600 | 45 | lacto | 7.64 | 100.000% | 0.5% sodium bicarbonate |
| 200 | 8.7 | 60 | 45 | lacto | 3.00 | 99.900% | 0.5% sodium bicarbonate |
| 200 | 8.7 | 120 | 45 | lacto | 7.64 | 100.000% | 0.5% sodium bicarbonate |
| 200 | 8.7 | 300 | 45 | lacto | 7.64 | 100.000% | 0.5% sodium bicarbonate |
| 200 | 8.7 | 600 | 45 | lacto | 7.64 | 100.000% | 0.5% sodium bicarbonate |
| | 8.5 | 2 days | 20 | aceto | 1.18 | 93.385% | used CIP |
| | 8.5 | 2 days | 20 | lacto | 4.35 | 99.996% | used CIP |
| | 9 | 2 days | 20 | aceto | 1.34 | 95.385% | used CIP |
| | 9 | 2 days | 20 | lacto | 5.12 | 99.999% | used CIP |
| 200 | 8.5 | 2 days | 20 | lacto | 7.20 | 100.000% | used CIP |
| 200 | 9 | 2 days | 20 | aceto | 1.67 | 97.846% | used CIP |
| 200 | 9 | 2 days | 20 | lacto | 7.20 | 100.000% | used CIP |
| 200 | 8.5 | 600 | 50 | lacto | 7.04 | 100.000% | used CIP |
| 200 | 9 | 600 | 50 | lacto | 7.04 | 100.000% | used CIP |
| 200 | 10.5 | 600 | 50 | lacto | 7.04 | 100.000% | used CIP |
| 200 | 8.5 | 60 | 50 | lacto | 2.44 | 99.636% | 1% sodium bicarbonate |
| 200 | 9 | 60 | 50 | lacto | 2.58 | 99.736% | 1% sodium bicarbonate |
| 200 | 10.5 | 60 | 50 | lacto | 7.04 | 100.000% | 1% sodium bicarbonate |
| 200 | 9 | 60 | 50 | aceto | 4.18 | 99.993% | 1% sodium bicarbonate |
| | 8.5 | 600 | 50 | lacto | 4.01 | 99.990% | used CIP |
| | 9 | 600 | 50 | lacto | 6.90 | 100.000% | used CIP |
| | 10.5 | 600 | 50 | lacto | 6.90 | 100.000% | used CIP |
| | 8.5 | 60 | 50 | lacto | 2.74 | 99.818% | 1% sodium bicarbonate |
| | 9 | 60 | 50 | lacto | 3.23 | 99.941% | 1% sodium bicarbonate |
| | 10.5 | 60 | 50 | lacto | 6.90 | 100.000% | 1% sodium bicarbonate |
| 200 | 8.5 | 600 | 50 | lacto | 6.90 | 100.000% | 1% sodium bicarbonate |

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for sanitizing a surface comprising:

applying to a surface a composition comprising:

(1) a C5 to C22 fatty acid selected from the group consisting of pentanoic acid, hexanoic acid, heptanoic acid, octanoic acid, nonanoic acid, decanoic acid, undecanoic acid, dodecanoic acid, lauric acid, and salts thereof; and (2) a source of alkalinity selected from the group consisting of hydroxides, carbonates, bicarbonates, amines, and mixtures thereof, wherein the composition does not comprise glycerol esters, and wherein the composition has a pH of 8.5 or greater and provides 3-log reduction against gram positive bacteria, gram negative bacteria, and yeasts within 1 minute at 50° C.

2. The method of claim 1, wherein the fatty acid is octanoic acid or nonanonic acid.

3. The method of claim 1, the composition further comprising a cationic amino ester.

4. The method of claim 1, the composition further comprising an alkyl lauroyl arginate.

5. The method of claim 1, the composition further comprising ethyl lauroyl arginate.

6. The method of claim 1, further comprising diluting the composition to form a use solution.

7. The method of claim 1, wherein the surface is processing equipment that is cleaned in-place.

8. The method of claim 1, wherein the surface is a membrane.

9. The method of claim 1, wherein the surface is food.

10. The method of claim 1, wherein the surface is a human or an animal.

11. The method of claim 1, wherein the surface is a wall, floor, drain, or high touch surface.

12. The method of claim 1, wherein the surface is a surgical instrument or located in a patient room or surgical suite.

13. The method of claim 1, wherein the surface is a hard surface.

14. The method of claim 1, wherein the composition is considered to be a food additive or a feed additive.

15. The method of claim 1, wherein the composition further comprises an additional functional ingredient selected from the group consisting of a thickener, a chelating agent, a solvent, a surfactant, a buffer, a pH adjuster, a corrosion inhibitor, a fragrance, a dye, and combinations thereof.

16. A method for sanitizing a surface comprising:

diluting a concentrate composition to form a use solution, wherein the concentrate composition is diluted at a ratio of about 1:100 to about 1:1500 of concentrate to water;

applying to a surface the use solution, the concentrate composition comprising:

(1) about 20 wt. % to about 90 wt. % of a C5 to C22 fatty acid selected from the group consisting of pentanoic acid, hexanoic acid, heptanoic acid, octanoic acid, nonanoic acid, decanoic acid, undecanoic acid, dodecanoic acid, lauric acid, and salts thereof; and (2) a cationic amino/ester, cationic amino/amide, or salt thereof, wherein the composition provides 3-log reduction against gram positive bacteria, gram negative bacteria, and yeasts within 1 minute at 50° C.

17. The method of claim 16, wherein the fatty acid is octanoic acid or nonanonic acid.

18. The method of claim 16, the composition comprising a cationic amino ester.

19. The method of claim 16, the composition comprising an alkyl lauroyl arginate.

20. The method of claim 16, the composition comprising ethyl lauroyl arginate.

21. The method of claim 16, further comprising a source of alkalinity.

22. The method of claim 16, wherein the composition has a pH of 9 or greater.

23. The method of claim 21, wherein the source of alkalinity is selected from the group consisting of hydroxides, carbonates, bicarbonates, amines, and mixtures thereof.

24. The method of claim 16, wherein the surface is processing equipment that is cleaned in-place.

25. The method of claim 16, wherein the surface is a membrane.

26. The method of claim 16, wherein the surface is food.

27. The method of claim 16, wherein the surface is a human or an animal.

28. The method of claim 16, wherein the surface is a wall, floor, drain, or high touch surface.

29. The method of claim 16, wherein the surface is a surgical instrument or located in a patient room or surgical suite.

30. The method of claim 16, wherein the surface is a hard surface.

31. The method of claim 16, wherein the composition is considered to be a food additive or a feed additive.

32. The method of claim 16, wherein the composition further comprises an additional functional ingredient selected from the group consisting of a thickener, a chelating agent, a solvent, a surfactant, a buffer, a pH adjuster, a corrosion inhibitor, a fragrance, a dye, and combinations thereof.

33. The method of claim 1, wherein the gram positive bacteria is *Lactobacillus brevis.*

34. The method of claim 1, wherein the gram negative bacteria is *Acetobacter aceti.*

35. The method of claim 1, wherein the yeasts are *Saccharomyces cerevisiae.*

36. The method of claim 16, wherein the gram positive bacteria is *Lactobacillus brevis.*

37. The method of claim 16, wherein the gram negative bacteria is *Acetobacter aceti.*

38. The method of claim 16, wherein the yeasts are *Saccharomyces cerevisiae.*

* * * * *